United States Patent
Yamagishi et al.

(10) Patent No.: US 8,240,746 B2
(45) Date of Patent: Aug. 14, 2012

(54) VEHICLE FRONT BODY STRUCTURE

(75) Inventors: Hideaki Yamagishi, Wako (JP); Kenji Koyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 12/855,393

(22) Filed: Aug. 12, 2010

(65) Prior Publication Data

US 2011/0084518 A1 Apr. 14, 2011

(30) Foreign Application Priority Data

Oct. 13, 2009 (JP) ................. 2009-236149

(51) Int. Cl.
B62D 25/08 (2006.01)
(52) U.S. Cl. .................. 296/192; 296/187.09
(58) Field of Classification Search .................. 296/192, 296/193.11, 193.09, 193.04, 198, 201, 203.01, 296/203.02, 190.1, 203.03, 203.4, 181.4, 296/187.01
See application file for complete search history.

(56) References Cited

U.S. PATENT DOCUMENTS

| | | | | |
|---|---|---|---|---|
| 3,383,784 A * | 5/1968 | Bien | ................ | 40/628 |
| 4,563,948 A * | 1/1986 | Cafferty | ................ | 101/128 |
| 4,652,337 A * | 3/1987 | Picone et al. | ................ | 216/45 |
| 6,672,620 B2 * | 1/2004 | Kawazu et al. | ................ | 280/834 |
| 6,921,126 B2 * | 7/2005 | Suh et al. | ................ | 296/192 |
| 7,147,275 B2 * | 12/2006 | Matsuyama et al. | ...... | 296/203.02 |
| 7,296,824 B2 * | 11/2007 | Yasui et al. | ................ | 280/784 |
| 7,407,220 B2 * | 8/2008 | Kanagawa et al. | ...... | 296/187.09 |
| 7,410,200 B2 * | 8/2008 | Kirschener | ................ | 296/97.7 |
| 7,469,956 B2 * | 12/2008 | Yasuhara et al. | ......... | 296/187.09 |
| 7,597,252 B1 * | 10/2009 | Dewitt | ................ | 235/381 |
| 2001/0033094 A1 * | 10/2001 | Sano et al. | ................ | 296/194 |
| 2005/0046237 A1 * | 3/2005 | Miyoshi et al. | .......... | 296/203.02 |

FOREIGN PATENT DOCUMENTS

| | | |
|---|---|---|
| JP | 50-68418 | 6/1975 |
| JP | 61-098682 | 5/1986 |
| JP | 11-180343 | 7/1999 |
| JP | 2001-001950 | 1/2001 |
| JP | 2004-330939 | 11/2004 |
| JP | 2005-119458 | 5/2005 |
| JP | 2006-224800 | 8/2006 |
| JP | 2006-327446 | 12/2006 |
| JP | 2006-327449 | 12/2006 |

* cited by examiner

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A vehicle front body structure includes a chassis number marking section on which a chassis number or vehicle identification number (VIN) is applied by stamping. The chassis number marking section is provided on a cowl assembly and disposed above a damper base to which an end of the cowl box is secured.

5 Claims, 5 Drawing Sheets

VEHICLE FRONT BODY STRUCTURE

FIELD OF THE INVENTION

The present invention relates to a front body structure for a vehicle having a marking section on which a chassis number or vehicle identification number (VIN) is applied by stamping.

BACKGROUND OF THE INVENTION

Motor vehicles have a chassis number marking section on which a chassis number or VIN is applied by stamping. In a typical example shown in Japanese Patent Laid-Open Publication (JP-A) No. 2005-119458, the chassis number marking section is provided in a cowl box of the vehicle front body portion that is formed by a windshield panel assembly and a dash upper panel assembly. A cowl top garnish having a generally U-shaped cross section opening in an obliquely downward and rearward direction of the vehicle is attached to an upper front end of the cowl box so that a hollow internal space of the cowl box can be used as an outside air intake duct for air conditioning as well as a rain water drainage gutter. The chassis number marking section has a rectangular plate-like configuration formed as a front end extension of the windshield panel assembly and extends substantially parallel to upper and lower legs of the U-shaped cowl top garnish. The plate-like chassis number marking section has an underside surface on which a chassis number is applied by stamping during manufacture of the vehicle body. The lower leg of the cowl top garnish has an opening to which a holder is removably mounted, and the holder has an aperture which is opened and closed by a sliding lid. The opening of the cowl top garnish and the aperture of the holder are aligned with the chassis number marking section so that the chassis number stamped on the chassis number marking section can be visually observed through the aperture while the sliding lid is disposed in a fully opened position. In the event that the existing chassis number is to be removed and replaced by a new chassis number, the holder is removed from the cowl top garnish so as to allow a stamping tool or apparatus to access the chassis number marking section through the opening of the top cowl garnish.

The arrangement shown in JP 2005-119458 A is not fully satisfactory in that the chassis number stamping process is tedious and time-consuming because the holder should be removed from the cowl top garnish to provide the opening through which the chassis number marking section is accessible to the stamping tool. Furthermore, the chassis number marking section formed as an end extension of the windshield panel assembly is relatively low in rigidity, which will lower the yield of the chassis number stamping process. Additionally, since the chassis number is stamped on the underside surface of the chassis number marking section, visual observation of the chassis number is uneasy to perform. When the vehicle encounters a frontal collision with an obstacle such as a pedestrian, the obstacle may crash against the cowl box and damage the chassis number marking section.

SUMMARY OF THE INVENTION

It is accordingly an object of the present invention to provide a vehicle front body structure having a chassis number marking section configured to ensure that a chassis number stamping process can be achieved easily and efficiently, a chassis number stamped on the chassis number marking section can be visually observed without difficulties, and the chassis number marking section is highly resistant to deformation or damage even when the vehicle is subjected to a frontal collision.

According to the present invention, there is provided a vehicle front body structure comprising a vehicle front body portion having a windshield and a pair left and right damper bases disposed on left and right sides of the vehicle front body portion for supporting a pair left and right front suspension devices, respectively, and a cowl assembly disposed contiguously with a lower end of the windshield and extending in a width direction of the vehicle front body portion. The cowl assembly has left and right end portions secured to the left and right damper bases, and a chassis number marking section disposed above one of the left and right damper bases.

With this arrangement, since the chassis number marking section is provided on the cowl assembly, it is readily possible to apply a chassis number onto a top surface of the chassis number marking section by impact stamping during the course of production of the cowl assembly. Due to the absence of any article which may hinder access to the chassis number marking section by a stamping tool or apparatus, the chassis number stamping process can be achieved easily and efficiently.

Furthermore, since the damper base and the chassis number marking section disposed above the damper base are normally covered by a front hood, the chassis number stamped on the top surface of the chassis number marking section can be readily visually observed by a human operator once the front hood is opened. The human operator is not forced to take a cramped or uncomfortable posture during visual observation of the chassis number.

When a frontal collision occurs, the damper base and a damper housing to which the damper base is secured function to disperse a frontal collision load to thereby protect the chassis number marking section disposed above the damper base. The damper base is highly rigid and the chassis number marking section disposed above the highly rigid damper base is highly resistant to deformation or damage.

Preferably, the vehicle front body structure further includes a support bracket mounted to connect a front portion of said one damper base and an adjacent front fender of the vehicle front body portion. The chassis number marking section is disposed above a part of the support bracket, and the support bracket is configured to undergo yielding when the front fender is displaced backward by a frontal collision load. When subjected to the frontal collision load via the front fender, the support bracket will undergo yielding and absorb part of the frontal collision load. By virtue of the yieldable configuration of the support bracket, it is possible to protect the chassis number marking section against damage even if the chassis number marking section is disposed above part of the support bracket.

In one preferred form of the invention, the support bracket has a base portion connected to the front portion of the damper base and disposed below the chassis number marking section, a fender supporting portion connected to the front fender, and a bent portion disposed between the base portion and the fender supporting portion and extending substantially perpendicularly to the base portion and the fender supporting portion. The support bracket is deformable to collapse backward at the bent portion when subjected to the frontal collision load applied via the front fender.

Preferably, the support bracket further has a washer-hose supporting portion for supporting a washer hose for cleaning the windshield. When a cowl top is attached to depress a lower edge the windshield onto the cowl assembly, the washer hose provided on the cowl top is automatically placed on the washer-hose supporting portion of the support bracket. This arrangement is particularly advantageous when used in combination with a windshield having a small radius of curvature in a horizontal plane wherein the cowl top is disposed adjacent to the damper base.

BRIEF DESCRIPTION OF THE DRAWINGS

One preferred structural embodiment of the present invention will be described in detail below, by way of example only, with reference to the accompanying drawings, in which.

DETAILED DESCRIPTION OF THE PREFERRED EMBODIMENT

Figure 1:
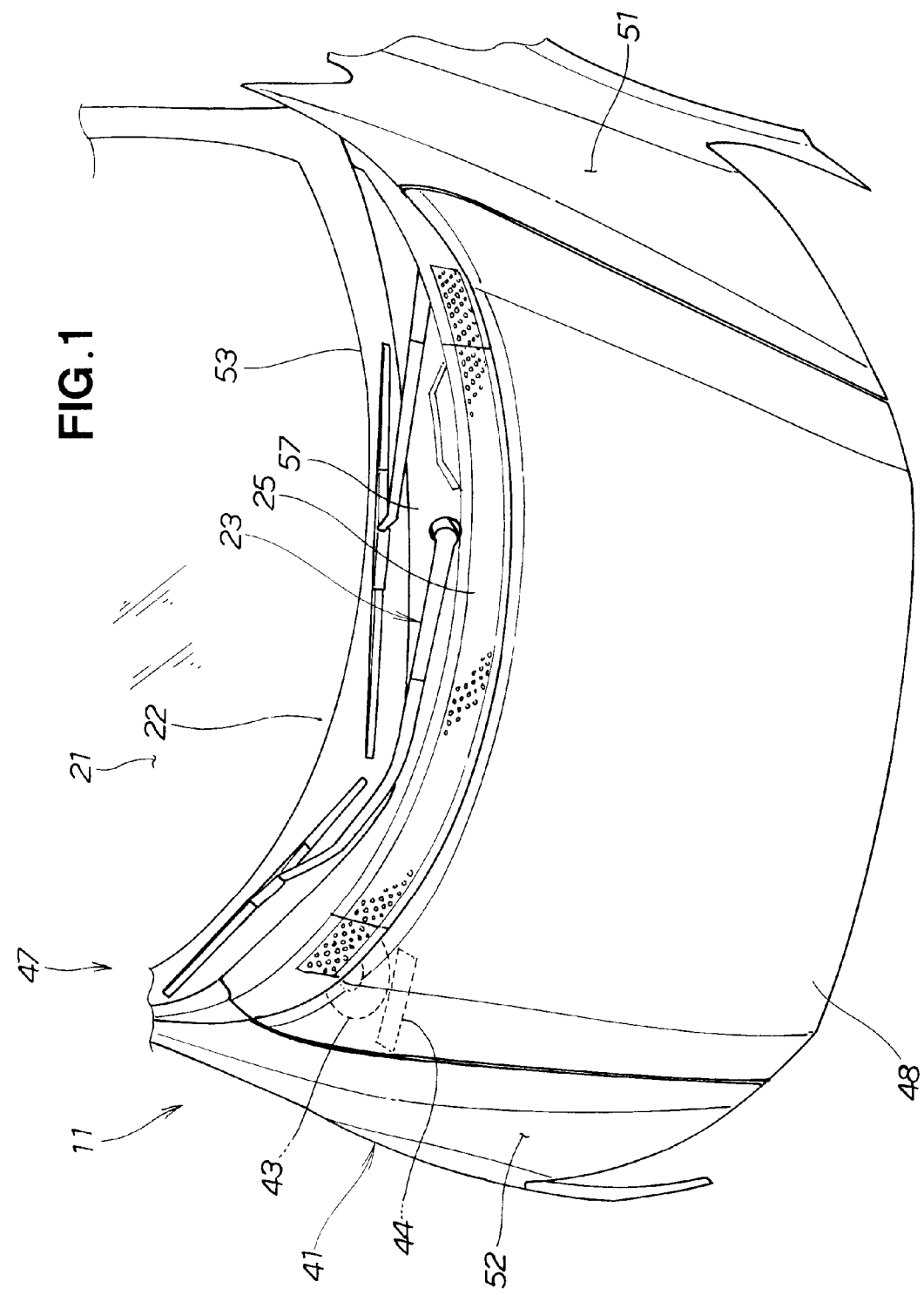
FIG. 1 is a fragmentary perspective view of a vehicle front body structure according to an embodiment of the present invention.

As shown in FIG. 1, a vehicle front body structure embodying the present invention constitutes that part of a vehicle 11 which is located near a lower end (forward end) 22 of a front glass or windshield 21 of the vehicle 11. The vehicle front body structure includes a chassis number marking section 44 disposed above a damper base 43 provided adjacent to the lower end 22 of the windshield 21 within a front body portion 41 of the vehicle 11.

The vehicle 11 includes a vehicle body 47 having the front body portion 41, a front hood 48, the windshield 21, and a windshield wiper device 23. The front body portion 41 includes a left fender 51, a right fender 52, a windshield lower panel 53 for supporting the lower end 22 of the windshield 21, and a windshield support 54 (FIG. 4) for retaining the windshield lower panel 53.

The front body portion 41 also includes a dashboard upper panel 34 (FIGS. 3 and 4) for supporting the windshield support 54, and a dashboard upper lid 35 connected to the dashboard upper panel 34. A cowl top 25 (FIG. 2) has a front end 56 connected to the dashboard upper lid 35 and a rear end 57 mounted to depress the lower end 22 of the windshield 21.

The front body portion 41 further includes the damper base 43 fastened with the dashboard upper lid 35, a left side frame (not shown), a right side frame (not shown), a left damper housing 63 (FIG. 4) provided on the left side frame, and a right damper housing 64 (FIGS. 2, 4 and 5) provided on the right side frame.

Figure 2:
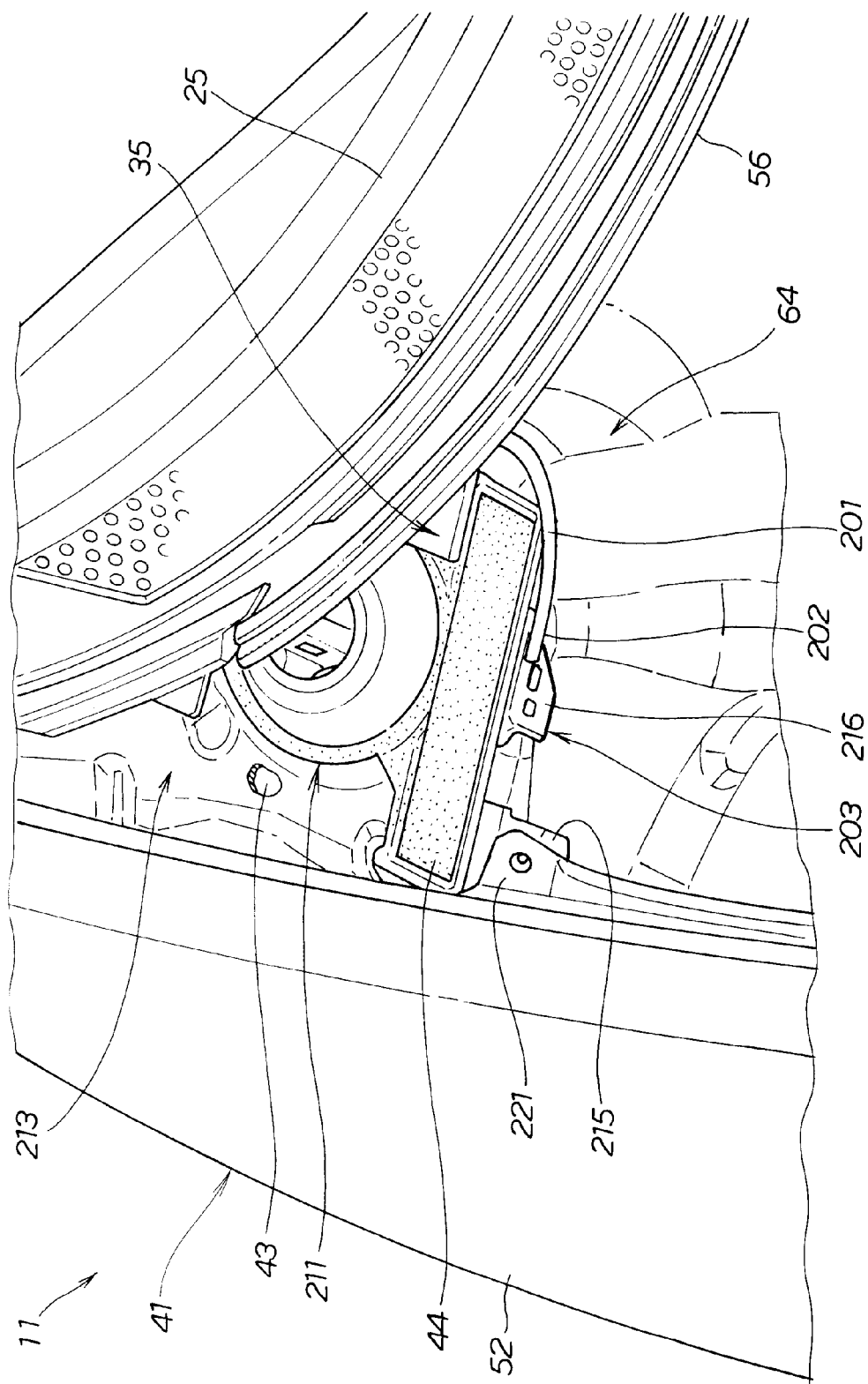
FIG. 2 is an enlarged perspective view of a portion of the vehicle front body structure including a chassis number marking section.

The cowl top 25 is provided with a washer hose 201 (FIG. 2). The washer hose 201 is configured to bend arcuately along the right damper housing 64 and has a connecting end 202 directed toward the right fender 52. The end 202 of the washer hose 201 is secured to a support bracket 203 via a pipe (not shown).

The dashboard upper panel 34 has a body portion 205 (FIG. 4) retaining thereon the lower end 22 of the windshield 21. More specifically, the body portion 205 of the dashboard upper panel 34 carries thereon the windshield support 54 and is connected to the windshield support 54, and the windshield support 54 supports the lower end 22 of the windshield 21 via the windshield lower panel 53.

Figure 4:
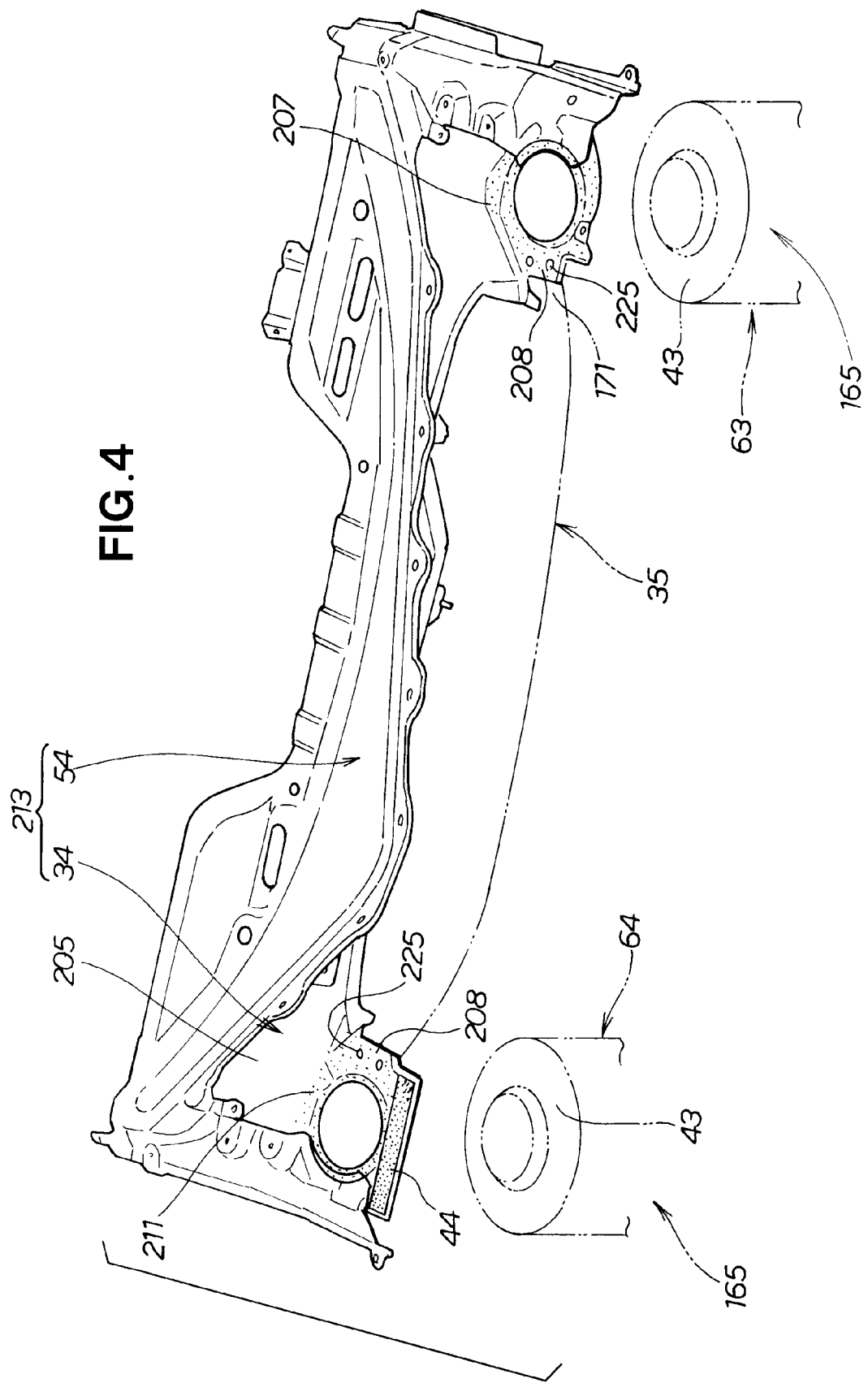
FIG. 4 is an enlarged perspective view of a cowl assembly of the vehicle front body structure.

As shown in FIG. 4, the dashboard upper panel 34 also includes an annular first connecting portion 207 formed contiguously with a left end of the body 205. The first connecting portion 207 (shown as being stippled for emphasis) is placed on the left damper base 43 of the left damper housing 63 and secured to the left damper base 43. The first connecting portion 207 has an attachment flange 208 projecting in a lateral inward direction of the vehicle body 47 (FIG. 1).

Similarly, the dashboard upper panel 34 has an annular second connecting portion 211 formed contiguously with a right end of the body 205. The second connecting portion 211 (shown as being stippled for emphasis) is placed on the right damper base 43 of the right damper housing 64 and secured to the right damper base 43. The second connecting portion 211 has an attachment flange 208 projecting in a lateral inward direction of the vehicle body 47 (FIG. 1). The chassis number marking section 44 is formed integrally with the second connecting portion 211 and projects from the second connecting portion 211 in a forward direction of the vehicle body 47 (FIG. 1).

As shown in FIGS. 1-5, the front body structure embodying the invention includes the chassis number marking section 44 disposed adjacent to the lower end (front end) of the windshield 21 within the front body portion 41 of the vehicle body 47. The chassis number marking section 44 is disposed above the right damper base 43 when left and right ends (i.e., the first and second connecting portions 207 and 211) of a cowl assembly 213 (FIG. 4) are attached to the left and right damper bases 43 formed on the left and right sides of the front body portion 41 of the vehicle body 47 for supporting left and right front suspension devices 165. As shown in FIG. 4, the cowl assembly 213 is disposed continuously with the lower end 22 of the windshield 21 and formed by the dashboard upper panel 34 and the windshield support 54 disposed above and connected to the dashboard upper panel 34.

Figure 5:
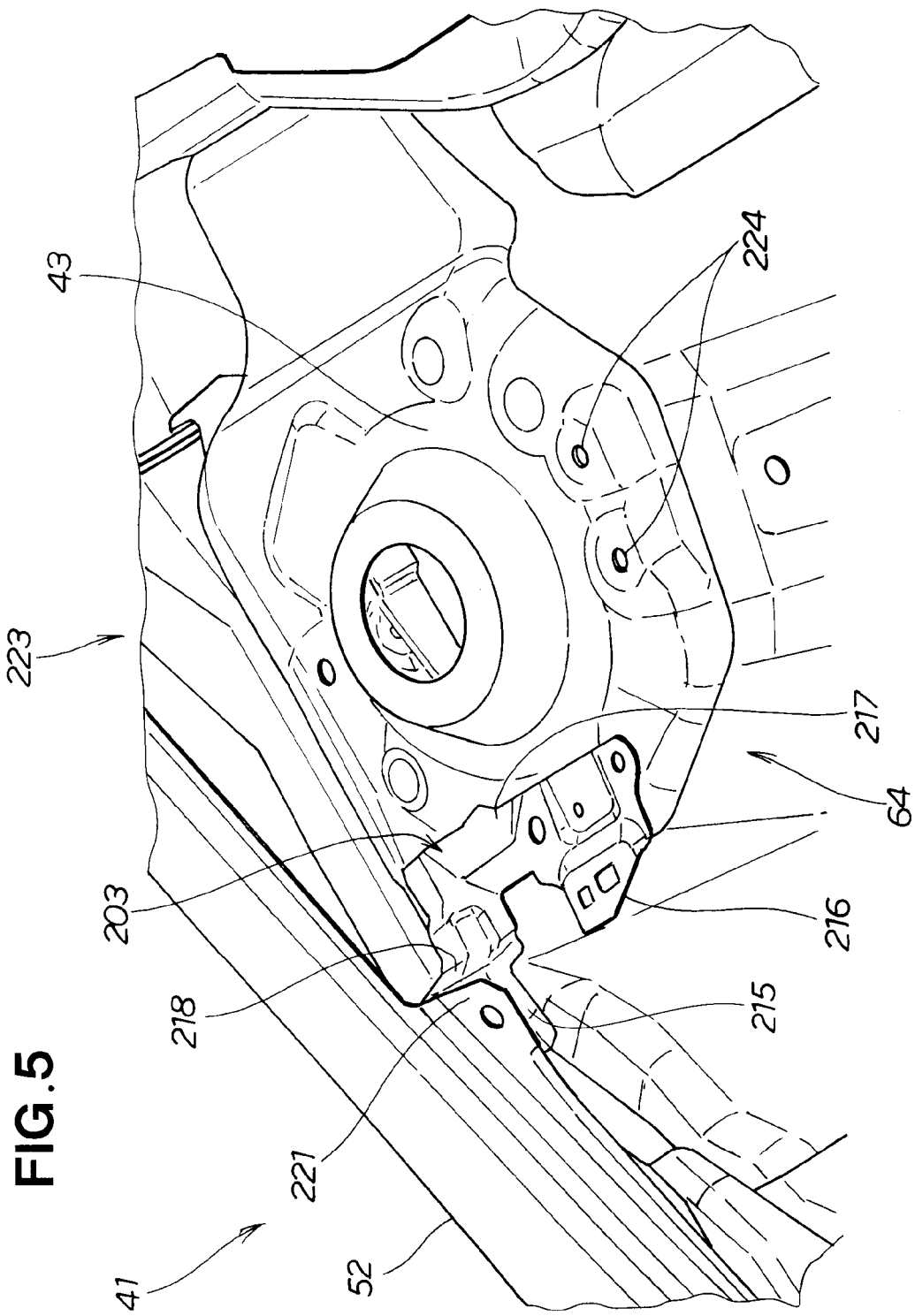
FIG. 5 is a perspective view of a portion of the vehicle front body structure including a damper base connected to a right fender via a bracket.

As shown in FIG. 5, the support bracket 203 is provided to connect the right front fender 52 of the front body portion 41 to a front portion of the right damper base 43. The support bracket 203 is configured to undergo permanent deformation of yielding when the right front fender 52 is displaced backward by a frontal collision load (indicated by the arrow "a1" shown in FIG. 3) occurring during frontal crash or collision of the vehicle. The chassis number marking section 44 is placed in a position adjacent to a rear end portion of the support bracket 203 when the first and second connecting portions 207, 211 (FIG. 4) of the cowl assembly 213 are secured to the left and right damper bases 43.

The support bracket 203 has a generally inverted L-shaped configuration including a substantially rectangular base portion 217 and a leg portion 215 extending from an end of the base portion 217 in a direction perpendicular to a longitudinal axis of the base portion. The base portion 217 is disposed on the front portion of the right damper base 43 and connected, for example, by spot-welding to the front portion of the right damper base 43. The first leg portion 215 is connected by a screw fastener (not shown) to an attachment lug 221 of the right front fender 52. The first leg portion 215 serves as a fender supporting portion. The L-shaped support bracket 203 also has a second leg portion 216 projecting from an opposite end of the base portion 217 in the same direction as the projecting direction of the first arm 215. The second leg portion 216 is much shorter than the leg portion (fender supporting portion) 215 and supports thereon the end 202 of the washer hose 201 (FIG. 2). The second leg portion 216 serves as a washer-hose supporting portion of the support bracket 203. The first leg portion (fender supporting portion) 215 is connected via a bent portion 218 to the base portion 217. The bent portion 218 is disposed between the fender supporting portion 215 and the base portion 217 and extends substantially perpendicularly to the fender supporting portion 215 and the base portion 217 for a purpose described below.

Figure 3:
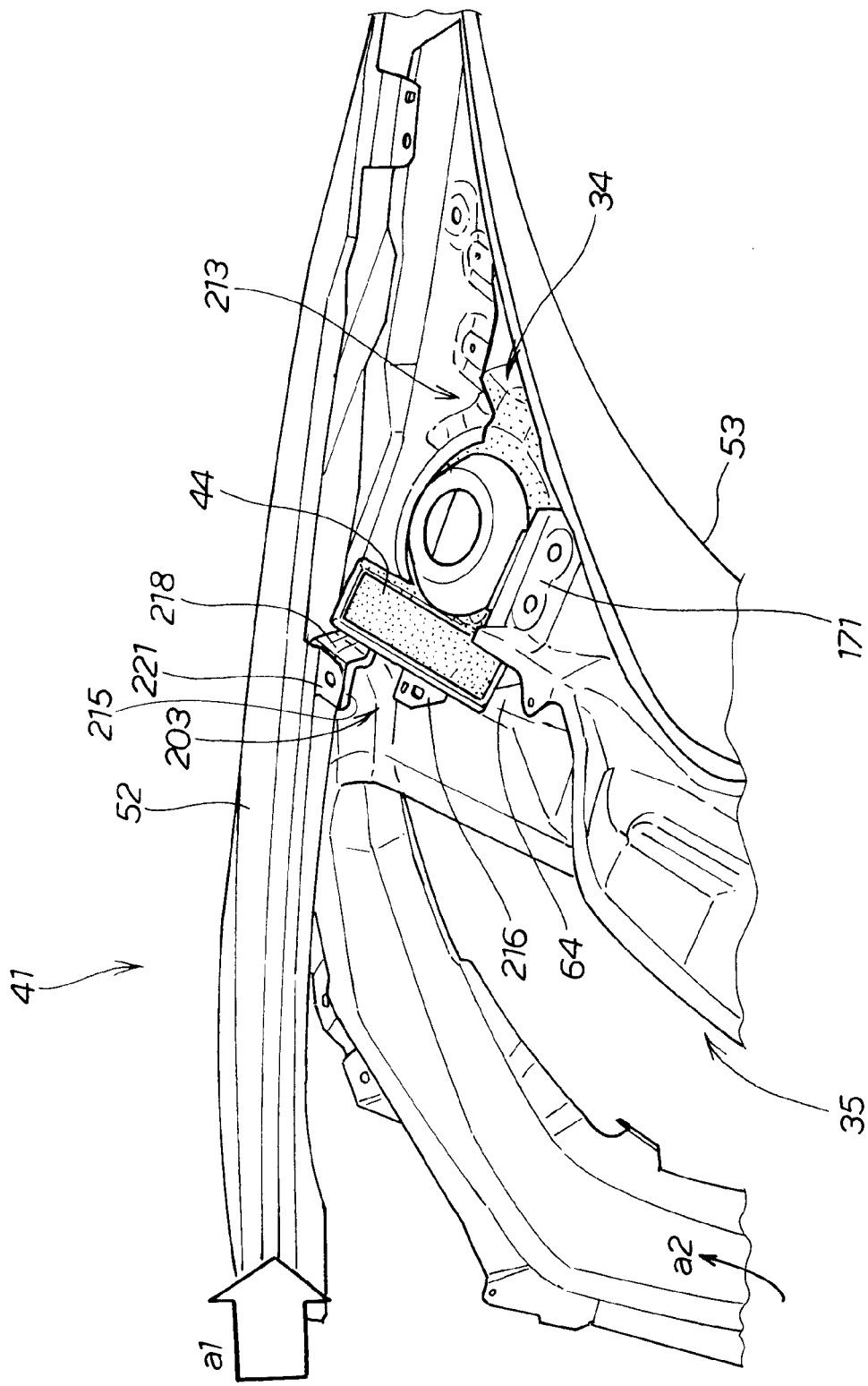
FIG. 3 is a perspective view, with parts removed for clarity, illustrative of the behavior of the vehicle front body structure when the vehicle is subjected to a frontal collision.

When a frontal collision occurs, the right front fender 52 is forcibly displaced backward by a frontal collision load (indicated by the arrow "a1" shown in FIG. 3). In this instance, since the fender supporting portion 215 of the support bracket 203 is connected via the bent portion 218 to the base portion 217 of the support bracket 203, the frontal collision load "a1" tending to force the right front fender 52 backward will concentrate at the bent portion 218 and eventually causes the support bracket 203 to collapse backward at the bent portion 218. It may be said that the support bracket 203 starts deforming or yielding to collapse backward at the bent portion 218 during frontal crash of the vehicle.

The base portion 217 of the bracket 203 shown in FIG. 5 is disposed below the chassis number marking section 44 shown in FIG. 2, and, as viewed in plan view, the fender supporting portion 215 and the washer-hose supporting portion 216 of the support bracket 203 project from the chassis number marking section 44 in a forward direction of the vehicle 11.

Next, description will be made to the assembly of the vehicle front body portion 41 according to the present invention. At first, a cowl assembly 213 is prepared in a cowl assembly producing station of a vehicle assembling line. As shown in FIG. 4, the cowl assembly 213 is formed by a dashboard upper panel 34 and a windshield support 54 which is joined to a body 205 of the dashboard upper panel 34. The cowl assembly 213 has a chassis number marking section 44 formed as an integral part thereof. Then, a chassis number (or a vehicle identification number=VIN) is applied by impact stamping onto a top surface of the chassis number marking section 44 of the cowl assembly 213.

The cowl assembly 213 with the chassis number (or VIN) stamped thereon is placed on a front body sub-assembly 223 (FIG. 5) in such a manner that through holes 225 formed in the attachment flange 208 of each of the left and right connecting portions 205, 211 of the dashboard upper panel 34 are aligned with internally threaded holes 224 formed in the corresponding one of the left and right damper bases 43. The front body sub-assembly 223 has been prepared with parts assembled in a condition shown in FIG. 5. More particularly, the base portion 217 of the support bracket 203 is connected by spot-welding to the front portion of the right damper base 43, and the fender supporting portion 215 of the support bracket 208 is connected by the non-illustrated screw fastener to the attachment lug 221 of the right front fender 52.

Then, a dashboard upper lid 35 (FIGS. 3 and 4) is assembled in such a manner that a damper base fastening portion 171 provided at each of the left and right ends of the dashboard upper lid 35 is first placed on the corresponding one of the attachment flanges 208 of the dashboard upper panel 34, as shown in FIG. 3, and subsequently secured by screw fasteners (not shown) to the corresponding damper base 43 together with the dashboard upper lid 35 of the cowl assembly 213.

At a downstream assembling station, a cowl top 25 is attached in a manner shown in FIG. 2. When the cowl top 25 is set in an attached or assembled position, the end 202 of the washer hose 201 is automatically placed on the washer-hose supporting portion 216 of the support bracket 203. The end 202 of the washer hose 201 is then connected to a pipe (not shown), and the pipe is firmly secured to the washer-hose supporting portion 216 of the support bracket 203.

Various advantageous effects attained by the vehicle front body structure of the present invention will be described below in detail.

Since the chassis number marking section 44 is provided on the cowl assembly 213 as an integral part thereof as shown in FIG. 4, it is readily possible to apply a chassis number onto a top surface of the chassis number marking section 44 by impact stamping during the course of production of the cowl assembly 213. Due to the absence of any article which may hinder access to the chassis number marking section 44 by a stamping tool or apparatus, the chassis number stamping process can be achieved easily and efficiently.

Furthermore, since the damper base 43 and the chassis number marking section 44 disposed above the damper base 43 are normally covered by the front hood 48 as shown in FIG. 1, the chassis number stamped on the chassis number marking section 44 can be readily visually observed by a human operator once the front hood is opened, as shown in FIG. 2. The human operator is not forced to take a cramped or uncomfortable posture during visual observation of the chassis number.

When the vehicle encounters a frontal collision, a part or component a2 of a frontal collision load a1 is dispersed by the damper base 43 and the damper housing 64, as shown in FIG. 3, so that the chassis number marking section 44 disposed above the damper base 41 is kept free from deformation or damage. The damper base 43 is highly rigid and the chassis number marking section 44 disposed above the highly rigid damper base 43 is highly resistant to deformation or damage.

Furthermore, when subjected to the frontal collision load a1 via the front fender 52, as shown in FIG. 3, the support bracket 203 will undergo yielding and absorb the frontal collision load part a1. By virtue of the yieldable configuration of the support bracket 203, it is possible to protect the chassis number marking section 44 against damage even if the chassis number marking section 44 is disposed above part of the support bracket 203.

In the illustrated embodiment described above, the chassis number marking section 44 is disposed above the right damper base 43. The present invention should by no means be limited to the illustrated embodiment but may include an arrangement in which the chassis number marking section 44 is disposed above the left damper base 43 shown in FIG. 4.

Obviously, various minor changes and modifications of the present invention are possible in light of the above teaching. It is therefore to be understood that within the scope of the appended claims the invention may be practiced otherwise than as specifically described.

What is claimed is:

1. A vehicle front body structure, comprising:
   a vehicle front body portion having a windshield and a pair of left and right damper bases disposed on left and right sides of the vehicle front body portion, respectively, for supporting a pair of left and right front suspension devices, respectively; and
   a cowl assembly disposed contiguously with a lower end of the windshield and extending in a width direction of the vehicle front body portion, wherein the cowl assembly has left and right end portions placed on and secured to the left and right damper bases, and a chassis number marking section provided by one of the left and right end portions and disposed above one of the left and right damper bases.

2. The vehicle front body structure according to claim 1, further comprising a support bracket mounted to connect a front portion of said one damper base and an adjacent front fender of the vehicle front body portion, wherein the chassis number marking section is disposed above a part of the support bracket, and the support bracket is configured to undergo yielding when the front fender is displaced backward by a frontal collision load.

3. The vehicle front body structure according to claim 2, wherein the support bracket has a base portion connected to the front portion of the damper base and disposed below the chassis number marking section, a fender supporting portion connected to the front fender, and a bent portion disposed between the base portion and the fender supporting portion and extending substantially perpendicularly to the base portion and the fender supporting portion, and wherein the support bracket is deformable to collapse backward at the bent portion when subjected to the frontal collision load applied via the front fender.

4. The vehicle front body structure according to claim 2, wherein the support bracket further has a washer-hose supporting portion for supporting a washer hose for cleaning the windshield.

5. The vehicle front body structure according to claim 1, wherein the cowl assembly is formed by a windshield support for supporting the lower end of the windshield, and a dashboard upper panel connected to the windshield support, and wherein the dashboard upper panel has a body portion retaining thereon the lower end of the windshield, left and right connecting portions formed contiguously with left and right ends of the body portion and connected to the left and right damper bases, and the chassis number marking section formed integrally with one of the left and right connecting portions and projecting from the one connecting portion in a forward direction of the vehicle body.

* * * * *